United States Patent

Nishihara et al.

Patent Number: 5,486,420
Date of Patent: Jan. 23, 1996

[54] HYDROPHOBIC SILICA POWDER, MANUFACTURING METHOD THEREOF AND DEVELOPER FOR ELECTROPHOTOGRAPHY

[75] Inventors: Akira Nishihara; Akihiro Nakamura; Shigehiro Arakawa, all of Omiya, Japan

[73] Assignee: Mitsubishi Materials Corporation, Tokyo, Japan

[21] Appl. No.: 191,435

[22] Filed: Feb. 3, 1994

[30] Foreign Application Priority Data

Feb. 3, 1993 [JP] Japan .................................. 5-016454

[51] Int. Cl.$^6$ ........................................ B32B 5/16
[52] U.S. Cl. .......................... 428/405; 428/407; 428/429
[58] Field of Search ...................... 428/403, 404, 428/405, 407, 429; 423/335; 106/490, 287.13, 481

[56] References Cited

U.S. PATENT DOCUMENTS

| | | | |
|---|---|---|---|
| 4,741,984 | 5/1988 | Imai et al. | 430/106.6 |
| 4,902,570 | 2/1990 | Heinemann et al. | 428/405 |
| 4,950,634 | 8/1990 | Williams et al. | 502/401 |
| 5,013,585 | 5/1991 | Shimizu et al. | 427/220 |
| 5,188,899 | 2/1993 | Matsumoto et al. | 428/405 |

Primary Examiner—D. S. Nakarani
Assistant Examiner—H. Thi Le
Attorney, Agent, or Firm—Ronald J. Kubovcik

[57] ABSTRACT

A hydrophobic silica powder, treated with an amino-substituted silane compound represented by the formula (1) and an organopolysiloxane, having an amount of triboelectrification relative to iron of from over +100 µC/g to up to +700 µC/g, and a hydrophobing ratio of at least 60% as measured by the transmittance method:

$$R^1SiR^2_{3-n}R^3_n \quad (1)$$

where $R^1$ is an amino-substituted alkyl group having from 1 to 10 carbon atoms; $R^2$ is an alkyl group having from 1 to 5 carbon atoms; $R^3$ is Cl, Br or an alkoxy group having from 1 to 5 carbon atoms; and n is an integer of from 1 to 3. The treatment is preferably carried out with the silica powder in a suspended state. When the hydrophobic silica powder is used as an agent for improving fluidity of a toner, a developer for electrophotography having a stable electrification and which has excellent fluidity can be obtained, and it is possible to clearly develop an electrostatic image free from fog and to obtain stable developing properties with a long service life.

4 Claims, No Drawings

HYDROPHOBIC SILICA POWDER, MANUFACTURING METHOD THEREOF AND DEVELOPER FOR ELECTROPHOTOGRAPHY

DETAILED DESCRIPTION OF THE INVENTION

1. Field of the Invention

The present invention relates to a hydrophobic silica powder useful as a toner additive, a manufacturing method thereof and a developer for electrophotography which contains the same.

2. Prior Art Description

A powder known as hydrophobic silica powder (hereinafter simply referred to as "hydrophobic silica") made by making a fine silica ($SiO_2$) powder surface hydrophobic with an organic substance is widely used as a fluidity improving agent in toners in the field of electrophotography including copying machines, laser printers and facsimile machines for ordinary paper. In these cases, triboelectrification relative to a carrier such as iron or iron oxide is one of the important properties.

Depending upon the electric charge of the photosensitive material used for the formation of an electrostatic image, a toner of the opposite charge is employed. To avoid hindering the electrification property of the toner or causing a serious change thereof, therefore, it is desirable to use a hydrophobic silica of the same polarity as that of the toner and that the electrification should be stable. Since a chalcogen material such as selenium conventionally used as a popular photosensitive material has a positive polarity, a toner negatively charged has been used for development, and consequently, a hydrophobic silica having a negative charge has been employed. Photosensitive materials comprising organic semiconductors developed recently are of the negative polarity type, so that positively charged toners are employed, and there is a demand for a hydrophobic silica having a large amount of positive electrification.

The amount of triboelectrification of a hydrophobic silica relative to iron presents a positive or negative value depending upon the kind of the particular organic treatment agent used to provide hydrophobic properties. As a method for obtaining a silica powder exhibiting positive electrification, there is known a method of treating the silica powder surface with an amino-substituted silane compound (Japanese Laid-Open Patent Publication No. 53-22,447). This silica powder treated with the amino-substituted silane compound is hydrophilic and is usually treated with hexamethyldisilazane to make it hydrophobic. However, even by treating it with the amino-substituted silane and hexamethyldisilazane, hydrophobicity of the silica powder is still insufficient, and problems such as susceptibility to environmental conditions, particularly humidity, an uncertain amount of electrification, and a short service life of the developer have been pointed out. Another problem has been an insufficient amount of electrification.

An object of the present invention is to provide a hydrophobic silica powder having both a sufficient hydrophobicity and a high positive triboelectrification relative to iron, and a method for manufacturing the hydrophobic silica powder.

Another object of the present invention is to provide a developer for electrophotography excellent in fluidity and having a stable electrification property by adding the above-mentioned silica powder to the toner.

SUMMARY OF THE INVENTION

As a result of extensive studies, the present inventors found that the above-mentioned objects were achieved by surface treatment of a silica powder with an amino-substituted silane compound and an organopolysiloxane.

The present invention provides a hydrophobic silica powder which has been treated with an amino-substituted silane compound represented by the following formula (1) and an organopolysiloxane and has an amount of triboelectrification relative to iron of from over +100 μC/g to up to +700 μC/g and a "hydrophobing ratio" of at least 60% as measured by the so-called transmittance method:

where $R^1$ is an amino-substituted alkyl group, the alkyl group having from 1 to 10 carbon atoms and the amino group being optionally substituted with alkyl, allyl and amino-substituted alkyl; $R^2$ is an alkyl group having from 1 to 5 carbon atoms; $R^3$ is Cl, Br or an alkoxy group having from 1 to 5 carbon atoms; and n is an integer of from 1 to 3.

DETAILED DESCRIPTION

According to the present invention, there is also provided a method of manufacturing the above-mentioned hydrophobic silica powder, which comprises the step of bringing a suspended silica powder into contact with the amino-substituted silane compound and organopolysiloxane, and a developer for electrophotography, wherein the hydrophobic silica powder is added to a toner.

The treatment agents used for the treatment of the silica powder in the present invention are an amino-substituted silane compound represented by the above-mentioned formula (1) and an organopolysiloxane.

The amino-substituted silane compound can impart positive electrification to the silica powder through reaction with the silica surface. The following compounds are typical examples of the amino-substituted silane compound, but ones other than these examples can be used as well:

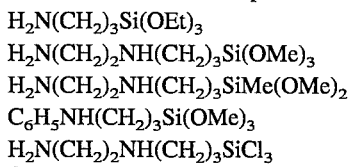

Organopolysiloxane is known also as silicone, and has been used as a water repellent. There is no particular restriction on the organopolysiloxane used in the present invention so far as a sufficient hydrophobicity can be imparted to the silica surface, but preferable ones in practice include those having a methyl, phenyl or hydroxy group as a substituent. More specifically, dimethylpolysiloxane, diphenylpolysiloxane and methylhydropolysiloxane are typical examples. In the treatment operation, the viscosity of the organopolysiloxane should preferably be within a range of from 10 to 1,000 cs, but one with a higher viscosity can be used by dilution with an appropriate solvent. The particularly preferred organopolysiloxane is dimethylpolysiloxane which is a low-viscosity liquid.

Typical commercially available organopolysiloxane products suitable for use in the present invention include KF-96, KF-99 and KF-56 manufactured by Shin-Etsu Silicone Co., Ltd. and SH 200, SH 510 and SH 1107 manufactured by Toray Dow-Corning Co., Ltd.

The silica powder used in the present invention consists of fine particles known as colloidal silica. No particular restriction is imposed on the particle size of the silica powder so far as the electrification property thereof is suitable for a particular application. The particle size should however preferably be at least 50 m²/g in terms of specific surface area. The optimum average size of a primary particle of silica powder is within a range of from about several nm to several hundred nm.

The hydrophobic silica powder of the present invention has an amount of triboelectrification relative to iron of from over +100 µC/g to up to +700 µC/g, and a hydrophobing ratio of at least 60% as measured by the transmittance method, as a result of treatment with the amino-substituted silane compound and the organopolysiloxane.

Measurement of the amount of triboelectrification relative to iron can be accomplished in accordance with any of the methods already disclosed in the literature (for example, "Shikizai [Coloring Materials]," 55[9], 630–636, (1982)). An amount of triboelectrification of +100 µC/g or less may reduce the positive electrification of the toner itself, and an amount of over +700 µC/g, on the other hand, may lead to an adverse effect on the stability of the electrification of the toner. In practice, the amount of triboelectrification relative to iron should preferably be within a range of from +200 to +500 µC/g.

The so-called transmittance method is used for experimentally determining the "hydrophobing ratio" of the treated silica powder, in which the measurement is made using the following procedure. The treated silica powder in an amount of 1.0 g and 100 ml water are put in an extracting flask, and intensely shaken and stirred for five minutes. Then, the flask is held stationary for one minute, and a slight amount of suspension is extracted from the bottom of the flask. The transmittance of a 550 nm beam through this liquid, as expressed using the transmittance through pure water as 100%, is adopted as the "hydrophobing ratio" of the silica powder.

As the value of the hydrophobing ratio thus measured increases, the hygroscopicity of the silica powder decreases, with a smaller change in the amount of electrification of a toner relative to humidity, and the effect of preventing aggregation is improved, thus bringing about a high value of utilization. In practice, a hydrophobing ratio of at least 60% suffices. A hydrophobing ratio of at least 70% is particularly preferred.

The hydrophobic silica powder of the present invention is manufactured by surface-treating a silica powder of an appropriate particle size (or specific surface area) with at least one amino-substituted silane compound and at least one organopolysiloxane. This surface treatment may be accomplished by any of the various known methods. A preferred method for obtaining a uniformly treated hydrophobic silica without aggregation comprises causing the silica powder to be in a suspended state and contacting the powder with the above-mentioned treatment agents.

Silica powder, comprising very fine particles, can be brought into a suspended state through mechanical stirring alone. The treatment can therefore be accomplished by subjecting the silica powder to sufficient mechanical stirring to produce a suspended state, and contacting the powder with an amino-substituted silane compound and an organopolysiloxane, diluted with a solvent as required, either simultaneously or sequentially (in any order), by dripping or spraying. As a result of this treatment, the silica powder surface is provided with a sufficient positive amount of triboelectrification on a level of over +100 µC/g relative to iron through reaction with the amino-substituted silane compound (between the hydroxyl group of the silica and an alkoxy group or halogen group of the amino-substituted silane compound). At the same time, the silica powder surface is provided with hydrophobicity by covering of the surface with the organopolysiloxane.

Any of the appropriate solvents such as alcohols, ketones and hydrocarbons can be used as the diluent in response to the viscosity of the amino-substituted silane compound and the organopolysiloxane employed. As a catalyst for increasing the reactivity of the amino-substituted silane compound, it is desirable to use an organic amine such as diethyleneamine simultaneously with the amino-substituted silane compound, or to blow ammonia gas into the silica powder to be treated. After addition of the treatment agent, the reaction is completed by heating at a temperature within a range of from 100° to 250° C. in a nitrogen atmosphere to eliminate the solvent (when used). Depending upon the heating temperature, the heating time should usually be within a range of from one to five hours including the time used to elevate the temperature. The above-mentioned treatment should preferably be carried out in an atmosphere of nitrogen or other inert gas to prevent oxidation of the treatment agent.

The amount of the two treatment agents necessary for obtaining the hydrophobic silica of the present invention in the above-mentioned treatment, i.e., a silica powder having an amount of triboelectrification relative to iron of from over +100 µC/g to up to +700 µC/g and a hydrophobing ratio of at least 60% as measured by the transmittance method varies with conditions such as the specific surface area of the silica powder to be treated and the kinds of the treatment agents. The necessary amount of the treatment agents can be easily determined through experimentation. In the case of a silica powder having a specific surface area of 130 m²/g, for example, a silica powder provided with the above-mentioned properties is available by limiting the consumption of the amino-substituted silane compound relative to the weight of silica to be treated within a range of from 3.0 to 15.0 wt. %, or more preferably, of from 4.0 to 10.0 wt. %, and that of the organopolysiloxane within a range of from 3.0 to 15.0 wt. %, or more preferably, of from 3.0 to 10.0 wt. %.

While the utilization ratio of the two treatment agents is not limited as long as a hydrophobic silica having the above-mentioned properties can be obtained through the treatment, the weight ratio of the amino-substituted silane compound to the organopolysiloxane should usually be within a range of from 10:3 to 3:10.

The hydrophobic silica of the present invention treated with an amino-substituted silane compound and an organopolysiloxane as described above can be added to the toner by a usual method. The toner generally contains a pigment and an electric charge control agent in slight amounts, in addition to a thermoplastic resin. The developer for electrophotography of the present invention is available by mixing this toner with a carrier (usually an iron powder or an iron oxide powder) and other additives. This developer can, so far as the toner contains the hydrophobic silica of the present invention blended therein, contain the other constituents used in the conventional developers, and the composition can be any of unitary and binary composition systems.

Even when the hydrophobic silica powder of the present invention is contained in a relatively large quantity in the toner, the properties of the toner are never impaired, and it is possible to sufficiently improve the fluidity of the toner. It was furthermore confirmed that it is more difficult for the resultant developer to be affected by humidity or temperature and that the occurrence of fog or quality degradation of an image became more difficult.

The amount of the hydrophobic silica of the present invention added to a toner may be an amount which permits improvement of the above-mentioned properties under the effects of the resultant developer, with no particular restrictions, but should usually be within a range of from 0.05 to 5.0 wt. % relative to the total weight of the toner.

EXAMPLES

For the purpose of assisting an understanding of the present invention, the following paragraphs present some examples and comparative examples which should not, however, be interpreted as limiting in any manner the present invention. In the examples, measurement of the hydrophobing ratio was carried out by the transmittance method, and measurement of the amount of triboelectrification was accomplished in accordance with a method disclosed in the "Shikizai(Coloring Materials)," 55[9], 630–636, (1982).

Example 1

A heated and dried silica powder (specific surface area: 130 m$^2$/g) in an amount of 20 g was placed in a stainless steel tube, and a treatment solution having the following composition was sprayed at room temperature while mechanically stirring the powder so as to cause suspension of silica particles in a nitrogen atmosphere.

| Composition of the treatment agent: | |
|---|---|
| Amino-substituted silane compound [H$_2$N(CH$_2$)$_3$Si(OEt)$_3$] | 1.00 g |
| Dimethylpolysiloxane [made by Shin-Etsu Kagaku Co.; KF-96, 50 cs] | 1.00 g |
| Diethylamine | a few drops |
| n-propanol | 5.0 ml |

After spraying followed by further stirring at room temperature for 30 minutes, external heating was carried out under a nitrogen gas flow. External heating was accomplished by raising the temperature to 150° C. over 40 minutes, then holding the silica powder at this temperature for 30 minutes, and then leaving the same to cool to room temperature. The thus treated silica powder had a hydrophobing ratio of 72% and an amount of triboelectrification relative to iron of +467 µC/g. As a result of treatment of the silica powder in the suspended state, the silica powder after treatment showed no sign of aggregation and a uniform treatment was ensured.

A toner was prepared by dispersing, in a styrene-acrylic acid copolymerized resin, 18 wt. % carbon (pigment) and 3 wt. % nigrosine (electric charge control agent) relative to the amount of the resin, crushing the dispersed mixture, and mixing 1 g of the silica powder mentioned above into 100 g of the colored resin powder resulting from classification of the colored resin powder into the 10 to 20 µm particles. Furthermore, 30 g of this toner were mixed with 1,000 g of iron oxide powder to form a developer for electrophotography. This developer had an amount of triboelectrification of +16 µC/g.

A service life test was conducted by charging this developer into a copying machine: no fog was produced in the images even after copying more than about 24,000 sheets. Moreover, the developer gave satisfactory images even in an environment comprising a high temperature and a high humidity (28° C. and 85%RH).

A developer prepared without the silica powder showed an amount of triboelectrification of +15 µC/g. Blending of the hydrophobic silica powder of the present invention, therefore, prevented occurrence of any serious change in the triboelectrification of the toner. A developer not containing this silica powder led to poor fluidity of toner, resulting in clogging at the toner feeding section.

Example 2

A heated and dried silica powder (specific surface area: 130 m$^2$/g) in an amount of 20 g was placed in a stainless steel container, and a treatment solution of the following composition was dripped into the container at room temperature while mechanically stirring the powder so as to cause suspension of the silica powder particles in a nitrogen atmosphere.

| Composition of the treatment agent: | |
|---|---|
| Amino-substituted silane compound [H$_2$N(CH$_2$)$_3$Si(OEt)$_3$] | 0.60 g |
| Dimethylpolysiloxane [made by Shin-Etsu Kagaku Co.; KF-96, 50 cs] | 1.50 g |
| Diethylamine | a few drops |
| n-propanol | 5.0 ml |

After the completion of dripping, stirring at room temperature and external heating were carried out in the same manner as in Example 1. The silica powder after treatment had a hydrophobing ratio of 86% and an amount of triboelectrification relative to iron of +251 µC/g. Since the amount of the amino-substituted silane compound was smaller and the amount of dimethylpolysiloxane was larger as compared with those in Example 1, the amount of triboelectrification was smaller and hydrophobicity was higher.

Then, a toner was prepared with the use of silica powder in the same manner as in Example 1, and a developer was prepared with the use of this toner in the same manner as in Example 1. This developer had an amount of triboelectrification of +16 µC/g.

A service life test was carried out by placing the developer into a commercially available copying machine: no fog occurred in the copied images even after copying more than 22,000 sheets. Satisfactory images were achieved even in an environment comprising a high temperature and a high humidity (28° C. and 85%RH).

A developer prepared without addition of the silica powder had an amount of triboelectrification of +16 µC/g.

Example 3

A silica powder was treated, and a toner and a developer for electrophotography were prepared in the same manner as in Example 1, except that the composition of the treatment agent was altered as follows:

| | |
|---|---|
| Amino-substituted silane compound [H$_2$N(CH$_2$)$_3$Si(OEt)$_3$] | 1.00 g |
| Dimethylpolysiloxane [made by Shin-Etsu Kagaku Co.; KF-96, 50 cs] | 2.00 g |
| Diethylamine | a few drops |
| n-propanol | 5.0 ml |

After the treatment, the silica powder had a hydrophobing ratio of 82% and an amount of triboelectrification relative to iron of +570 μC/g. The resultant developer had an amount of triboelectrification of +17 μC/g.

A service life test was carried out by charging this developer into a commercially available copying machine: no fog was produced in the copied images even after copying more than 25,000 sheets. Furthermore, satisfactory images were obtained even in an environment comprising a high temperature and a high humidity (28° C. and 85%RH).

A developer prepared without addition of the silica powder had an amount of triboelectrification of +16 μC/g.

Example 4

A silica powder was treated, and a toner and a developer for electrophotography were prepared in the same manner as in Example 1, except that the composition of the treatment agent was altered as follows:

| | |
|---|---|
| Amino-substituted silane compound [$H_2N(CH_2)_3Si(OEt)_3$] | 1.50 g |
| Dimethylpolysiloxane [made by Shin-Etsu Kagaku Co.; KF-96, 50 cs] | 2.00 g |
| Diethylamine | a few drops |
| n-propanol | 5.0 ml |

After the treatment, the silica powder had a hydrophobing ratio of 81%, and an amount of triboelectrification relative to iron of +682 μC/g. The resultant developer had an amount of triboelectrification of +17 μC/g.

A service life test was carried out by charging this developer into a commercially available copying machine: no fog was produced in the copied images even after copying more than 26,000 sheets. Furthermore, a satisfactory image were obtained even in an environment comprising a high temperature and a high humidity (28° C. and 85%RH).

A developer prepared without addition of the silica powder had an amount of triboelectrification of +16 μC/g.

Example 5

A silica powder was treated, and a toner and a developer for electrophotography were prepared in the same manner as in Example 1, except that the composition of the treatment agent was altered as follows:

| | |
|---|---|
| Amino-substituted silane compound [$H_2N(CH_2)_2NH(CH_2)_3Si(OMe)_3$] | 1.00 g |
| Dimethylpolysiloxane [made by Shin-Etsu Kagaku Co.; KF-96, 50 cs] | 1.00 g |
| Diethylamine | a few drops |
| Acetone | 5.0 ml |

After the treatment, the silica powder had a hydrophobing ratio of 84% and an amount of triboelectrification relative to iron of +538 μC/g. The resultant developer had an amount of triboelectrification of +16 μC/g.

A service life test was carried out by charging this developer into a commercially available copying machine: no fog was produced in the copied images even after copying more than 23,000 sheets. Furthermore, satisfactory images were obtained even in an environment comprising a high temperature and a high humidity (28° C. and 85%RH).

A developer prepared without addition of the silica powder had an amount of triboelectrification of +16 μC/g.

Example 6

A heated and dried silica powder (specific surface area: 130 m²/g) in an amount of 20 g was placed in a stainless steel container, and a treatment solution of the following composition was sprayed at room temperature while mechanically stirring the powder so as to cause suspension of the silica powder particles in a nitrogen atmosphere.

| Composition of the treatment solution: | |
|---|---|
| Amino-substituted silane compound [$H_2N(CH_2)_2NH(CH_2)_3SiCl_3$] | 1.00 g |
| Dimethylpolysiloxane [made by Shin-Etsu Kagaku Co.; KF-96, 50 cs] | 1.00 g |
| n-hexane | 5.0 ml |

After the completion of spraying, followed by stirring at room temperature for 30 minutes, ammonia gas was blown for five minutes, and external heating was conducted under a nitrogen gas flow. External heating was accomplished by raising the temperature to 180° C. over 40 minutes, and holding the same at this temperature for 30 minutes. The silica powder was then left to cool to room temperature. The treated silica powder had a hydrophobing ratio of 79%, and an amount of triboelectrification relative to iron of +553 μC/g.

Then, a toner was prepared using this silica powder in the same manner as in Example 1, and a developer was prepared using this toner in the same manner as in Example 1. This developer had an amount of triboelectrification of +16 μC/g.

A service life test was carried out by placing the developer into a commercially available copying machine: no fog occurred in the copied images even after copying more than 23,000 sheets. A satisfactory image was achieved even in an environment comprising a high temperature and a high humidity (28° C. and 85%RH).

A developer prepared without adding the silica powder had an amount of triboelectrification of +15 μC/g.

Example 7

A heated and dried silica powder (specific surface area: 130 m²/g) in an amount of 20 g was placed in a stainless steel container, and a treatment solution of the following composition was sprayed into the container at room temperature while mechanically stirring the powder so as to cause suspension of the silica powder particles in a nitrogen atmosphere.

| Compsotion of treatment agent: | |
|---|---|
| Amino-substituted silane compound [$H_2N(CH_2)_3Si(OEt)_3$] | 1.00 g |
| Methylhydropolysiloxane [made by Shin-Etsu Kagaku Co.; KF-99, 50 cs] | 1.00 g |
| Methylamine | a few drops |
| n-propanol | 5.0 ml |

After the completion of spraying, followed by stirring at room temperature for 30 minutes, external heating was applied under a nitrogen gas flow. External heating was accomplished by raising the temperature to 170° C. over 40 minutes, and holding the same at this temperature for 30 minutes. The silica powder was then left to cool to room temperature. The treated silica powder had a hydrophobing ratio of 88%, and an amount of triboelectrification relative to iron of +513 μC/g.

Then, a toner was prepared using this silica powder in the same manner as in Example 1, and a developer was prepared using this toner in the same manner as in Example 1. This developer had an amount of triboelectrification of +17 μC/g.

A service life test was carried out by placing the developer into a commercially available copying machine: no fog occurred in the copied images even after copying more than 25,000 sheets. Satisfactory images were achieved even in an environment comprising a high temperature and a high humidity (28° C. and 85%RH).

A developer prepared without adding the silica powder had an amount of triboelectrification of +16 μC/g.

Comparative Example 1

A silica powder was treated, and a toner and a developer for electrophotography were prepared in the same manner as in Example 1, except that the composition of the treatment agent was altered as follows:

| | |
|---|---|
| Amino-substituted silane compound [$H_2N(CH_2)_3Si(OEt)_3$] | 1.00 g |
| Diethylamine | a few drops |
| n-propanol | 5.0 ml |

After the completion of treatment, the silica powder had a hydrophobing ratio of 18%, and an amount of triboelectrification relative to iron of +285 μC/g. The resultant developer had an amount of triboelectrification of +16 μC/g. Because the treatment agent did not contain an organopolysiloxane, the silica powder after treatment showed a very low hydrophobicity.

A service life test was carried out by charging this developer into a commercially available copying machine: fog occurred in the copied images after copying about 5,000 sheets. Fog occurred in the copied image upon copying about 1,500 sheets in an environment comprising a high temperature and a high humidity (28° C. and 85%RH).

A developer prepared without adding silica powder had an amount of triboelectrification of +15 μC/g.

Comparative Example 2

A silica powder was treated, and a toner and a developer for electrophotography were prepared in the same manner as in Example 1, except that the composition of the treatment agent was altered as follows:

| | |
|---|---|
| Amino-substituted silane compound [$H_2N(CH_2)_3Si(OEt)_3$] | 1.00 g |
| Hexamethyldisilazane (HMDS) | 1.00 g |
| Diethylamine | a few drops |
| n-propanol | 5.0 ml |

After the treatment, the silica powder had a hydrophobing ratio of 24%, and an amount of triboelectrification relative to iron of +187 μC/g. The resultant developer had an amount of triboelectrification of +18 μC/g. When the organopolysiloxane was replaced by HMDS in accordance with the prior art, the amount of triboelectrification decreased and hydrophobicity was insufficient.

A service life test was carried out by charging this developer into a commercially available copying machine: fog occurred in the copied image upon copying about 7,000 sheets. Fog occurred in the copied image upon copying about 5,500 sheets in an environment comprising a high temperature and a high humidity (28° C. and 85%RH).

A developer prepared without adding silica powder had an amount of triboelectrification of +16 μC/g.

As is clear from the above description, the treatment of a silica powder by the simultaneous use of an amino-substituted silane compound and an organopolysiloxane produces a silica powder having an amount of triboelectrification relative to iron of from over +100 μC/g to up to +700 μC/g, and a hydrophobing ratio of at least 60% as measured by the transmittance method. When the treatment is applied with the silica powder in a suspended state, it is possible to obtain a hydrophobic silica uniformly treated without aggregation. If this silica powder is added as an agent for improving fluidity to a toner for electrophotography, it is possible to clearly develop an electrostatic image free from fog, and to obtain stable developing properties with a long service life.

What is claimed is:

1. A hydrophobic silica powder comprising a silica powder treated with an amino-substituted silane selected from the group consisting of $H_2N(CH_2)_3Si(OEt)_3$ $H_2N(CH_2)_2NH(CH_2)_3Si(OMe)_3$ $H_2N(CH_2)_2NH(CH_2)_3SiMe(OMe)_2$ $C_6H_5NH(CH_2)_3Si(OMe)_3$ and $H_2N(CH_2)_2NH(CH_2)_3SiCl_3$ and an organopolysiloxane selected from the group consisting of dimethylpolysiloxane, diphenylpolysiloxane, and methylhydropolysiloxane and having an amount of triboelectrification relative to iron of from +467 μC/g to up to +700 μC/g and a hydrophobing ratio of at least 60%, said hydrophobing ratio being the ratio of transmittance of a 550 nm beam through a suspension of 1.0 g of said silica powder in 100 ml of water to the transmittance of a 550 nm beam through pure water.

2. The hydrophobic silica powder as claimed in claim 1, wherein the silica powder is a colloidal silica having a specific surface area of at least 50 $m^2/g$.

3. The hydrophobic silica powder as claimed in claim 2, wherein the silica powder has an average particle size of several nm to several hundred nm.

4. The hydrophobic silica powder as claimed in claim 1, wherein the hydrophobing ratio is at least 70%.

* * * * *